US009050952B2

(12) United States Patent
Groger et al.

(10) Patent No.: US 9,050,952 B2
(45) Date of Patent: Jun. 9, 2015

(54) DEVICE AND METHOD FOR CONTROLLING THE DRIVING DYNAMICS OF A VEHICLE

(75) Inventors: Jens Groger, Hannover (DE); Wolfgang Strache, Hemmingen (DE)

(73) Assignee: WABCO GmbH, Hannover (DE)

( * ) Notice: Subject to any disclaimer, the term of this patent is extended or adjusted under 35 U.S.C. 154(b) by 56 days.

(21) Appl. No.: 14/124,095

(22) PCT Filed: Mar. 15, 2012

(86) PCT No.: PCT/EP2012/001152
§ 371 (c)(1),
(2), (4) Date: Dec. 5, 2013

(87) PCT Pub. No.: WO2013/004318
PCT Pub. Date: Jan. 10, 2013

(65) Prior Publication Data
US 2014/0114545 A1 Apr. 24, 2014

(30) Foreign Application Priority Data

Jul. 5, 2011 (DE) .......................... 10 2011 106 666
Aug. 18, 2011 (DE) .......................... 10 2011 111 012
Oct. 6, 2011 (DE) .......................... 10 2011 114 977

(51) Int. Cl.
| B60T 8/17 | (2006.01) |
| B60T 8/1755 | (2006.01) |
| B60W 10/06 | (2006.01) |
| B60W 10/184 | (2012.01) |
| B60W 30/02 | (2012.01) |
| B60W 40/114 | (2012.01) |
| B60W 50/00 | (2006.01) |

(52) U.S. Cl.
CPC ............. *B60T 8/1701* (2013.01); *B60T 8/1755* (2013.01); *B60W 10/06* (2013.01); *B60W 10/184* (2013.01); *B60W 30/02* (2013.01); *B60W 40/114* (2013.01); *B60W 2050/0036* (2013.01); *B60W 2300/125* (2013.01); *B60W 2520/10* (2013.01); *B60W 2520/105* (2013.01); *B60W 2520/125* (2013.01); *B60W 2520/14* (2013.01); *B60W 2520/28* (2013.01); *B60W 2540/18* (2013.01)

(58) Field of Classification Search
CPC .... B60T 8/1701; B60T 8/1755; B60W 10/06; B60W 30/02; B60W 40/114; B60W 10/184; B60W 2520/14; B60W 23/125; B60W 2520/28; B60W 2520/105; B60W 2520/10; B60W 2540/18; B60W 2050/0036; B60W 2520/125
See application file for complete search history.

(56) References Cited

U.S. PATENT DOCUMENTS

| 2001/0016791 A1 | 8/2001 | Bolzmann et al. |
| 2010/0292903 A1 | 11/2010 | Stoehr et al. |
| 2012/0109470 A1 | 5/2012 | Amtsfeld et al. |

FOREIGN PATENT DOCUMENTS

| DE | 197 16 391 A1 | 11/1997 |
| DE | 10 2009 013 895 A1 | 9/2010 |
| DE | 10 2009 033 366 A1 | 1/2011 |
| EP | 1 118 519 A2 | 7/2001 |
| EP | 1 584 545 A2 | 10/2005 |

*Primary Examiner* — John Q Nguyen
*Assistant Examiner* — Michael Kerrigan
(74) *Attorney, Agent, or Firm* — Kramer Levin Naftalis & Frankel LLP

(57) ABSTRACT

In a device and method for controlling the driving dynamics of a vehicle having a driver's cab spring mounted with respect to the vehicle frame, the yaw rate and deflection of the driver's cab are detected. A yaw rate sensor is arranged in the driver's cab, and the yaw rate of the vehicle frame is estimated or calculated from the yaw rate and deflection of the driver's cab. If the difference between the estimated or calculated yaw rate of the vehicle frame and a desired yaw rate exceeds a limit value, the brake system and/or the drive are actuated.

11 Claims, 3 Drawing Sheets

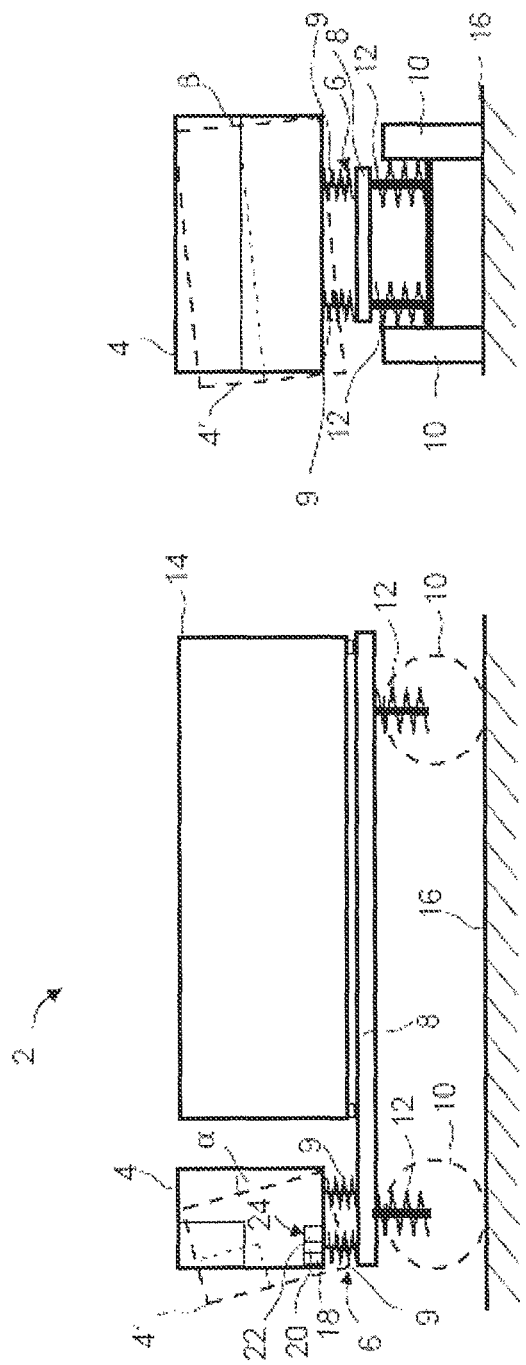

DEVICE AND METHOD FOR CONTROLLING THE DRIVING DYNAMICS OF A VEHICLE

FIELD OF THE INVENTION

The present invention generally relates to a method and a device for regulating the driving dynamics of a vehicle, in particular a utility vehicle, having a driver's cab mounted resiliently with respect to the vehicle frame.

BACKGROUND OF THE INVENTION

Conventionally, vehicles are equipped with driving dynamics regulation systems, which, by means of targeted braking of individual wheels, prevent vehicle breakaways. In the case of a utility vehicle, the necessary sensor unit, and also a corresponding control unit, are typically installed on the vehicle frame. Given the demand for producing components at lower cost and for permitting simpler assembly, there is a need for the sensor unit and the control unit to be integrated and installed in the driver's cab of the vehicle. However, this presents a problem in that the driver's cab is mounted resiliently on the vehicle frame and thus performs movements relative to the vehicle frame. As a result, a double spring-mass system is formed in which a first spring-mass subsystem is formed by the cab and the resilient mounting thereof, and a second spring-mass subsystem is formed by the vehicle frame and a wheel suspension.

The aim of the driving dynamics regulation system is normally to detect the states on the vehicle frame, in particular the yaw rate on the vehicle frame, in order, if appropriate, to perform stabilizing interventions if the measured yaw rate does not correspond to the setpoint yaw rate determined from the steer angle and the vehicle speed. A measurement of the yaw rate in the driver's cab, however, can lead to erroneous measurement values owing to the resilient suspension of the cab with respect to the vehicle frame.

A first example of such a source of errors is that, owing to a four-point suspension arrangement, the cab can perform tumbling movements such that a yaw rate sensor arranged in the cab might provide a signal even without the vehicle frame rotating about its vertical axis. Such signals from a yaw rate sensor might lead to possibly erroneous interventions with respect to the brake system of the vehicle and/or the drive of the vehicle.

A further example of a source of errors is that the driver's cab tilts forward during a braking manoeuvre. Thus, the axis of a yaw rate sensor arranged in the vehicle cab is inclined, such that the sensor signal measured by the yaw rate sensor might be too low. Such an error is potentially dangerous because it might not be possible for a breakaway of the vehicle to be counteracted until too late, with the possible result of an accident.

DE 10 2009 013 815 A1 discloses a generic device of the general type under consideration and a generic method. DE 10 2009 013 895 A1, however, proposes that signals attributable to an oscillation of the driver's cab be filtered out and not used as measurement signals within the driving dynamics regulation system. A disadvantage of this is that, in the event of an oscillation of the driver's cab, no usable yaw rate information pertaining to the vehicle frame is available, such that reliable driving dynamics regulation is not ensured.

SUMMARY OF THE INVENTION

Generally speaking, it is an object of the present invention to improve the driving dynamics regulation despite the required yaw rate sensor being arranged in the driver's cab.

According to an embodiment of the present invention, a device for regulating the driving dynamics of a vehicle having a driver's cab mounted resiliently with respect to the vehicle frame includes a steer angle sensor for measuring the steer angle, a yaw rate sensor for measuring the yaw rate of the driver's cab, a further sensor for determining the deflection of the driver's cab out of a reference position, and a control unit for evaluating the signals provided by the sensors and for influencing the brake system and/or drive of the vehicle as a function thereof. Here, the yaw rate sensor, and, preferably, also the control unit and, if appropriate, also the steer angle sensor, are arranged in the driver's cab. By means of the control unit, a yaw rate of the vehicle frame is estimated and/or calculated as a function of the yaw rate of the driver's cab and as a function of the deflection of the driver's cab out of its reference position.

In the present context, the expression "estimation" or the like is to be understood to mean the approximate determination of a variable, such as, for example, the yaw rate, using calculated mathematical methods, that is, an estimation in the mathematical sense and not in the colloquial sense in the manner of a determination of a variable by intuition. Such mathematical methods are based on complex models such as, for example, the observer model, and therefore also require the use of computers. Therefore, in the present case, the expression "estimation" also comprises a calculation, and therefore the wording "estimation and/or calculation" is variously used.

The brake system and/or the drive of the vehicle is influenced if the difference between the estimated and/or calculated yaw rate and a setpoint yaw rate of the vehicle frame lies above a predefined threshold value, wherein the setpoint yaw rate is determined by the control unit at least as a function of the measured steer angle and as a function of the vehicle speed pertaining to the vehicle frame and, if appropriate, as a function of further movement parameters such as the transverse acceleration of the vehicle frame, and/or as a function of driving parameters such as a deceleration signal or braking demand or brake pressure.

It is advantageous for a regulating intervention to take place only if the difference between the estimated and/or calculated yaw rate and the setpoint yaw rate exceeds a threshold value, in order that the required transverse forces can be built up by the vehicle tires during cornering.

According to embodiments of the present invention, it is possible to dispense with the measurement of the yaw rate on the vehicle frame. This is advantageous because, on the vehicle frame, there is normally only an extremely small amount of space available for corresponding components, and furthermore, components mounted on the vehicle frame must be protected against moisture, heat, cold, dust and dirt. Such special protection is substantially eliminated if the corresponding components are arranged in the driver's cab. Furthermore, cumbersome cabling of components arranged on the vehicle frame is eliminated if the components are arranged in the driver's cab.

According to embodiments of the invention, however, despite the measurement of the yaw rate in the driver's cab, it is possible to determine a yaw rate on the vehicle frame by estimation and/or calculation. Specifically, a yaw rate pertaining to the vehicle frame can be inferred from a yaw rate pertaining to the driver's cab even though the driver's cab and the vehicle frame behave differently owing to the resilient mounting of the driver's cab on the vehicle frame.

The provision of a yaw rate pertaining to the vehicle frame is advantageous because problematic driving states such as a breakaway or skidding occur primarily at the vehicle frame.

Therefore, a yaw rate pertaining to the vehicle frame is required even when it cannot be measured. Through the inventive provision of the yaw rate pertaining to the vehicle frame, the driving dynamics regulation can be successfully performed at all times even in the event of an oscillation or pitching or rolling movement of the driver's cab.

In one embodiment, the further sensor is associated with at least one further control or regulation system of the vehicle that serves for some function other than driving dynamics regulation, wherein the further sensor additionally senses further vehicle and/or vehicle-environment and/or vehicle-movement data and/or parameters. Such further control or regulation systems are primarily driver assistance systems such as, for example, a lane keeping assistance system, a proximity warning system or else a transmission control system. Therefore, the further sensor may preferably comprise one or two cameras, a RADAR, a LIDAR and/or an acceleration sensor, in particular for sensing accelerations in the vehicle longitudinal direction, in or on the transmission. The sensor generates image data or proximity data and preferably vehicle longitudinal acceleration data. With the use of the further sensor, no additional sensors are required for the estimation and/or calculation of the yaw rate on the vehicle frame. The result is, thus, a particularly inexpensive solution.

In a further embodiment, the further sensor—with the exception of the acceleration sensor—senses a section of the environment of the vehicle from the driver's cab, wherein the control unit determines the deflection of the driver's cab from a change in the sensed section. This is advantageous because, in this way, the movement of the driver's cab with respect to the environment can be detected. Assuming that the vehicle frame remains substantially parallel to the roadway, it is possible, from such a change in the sensed section of the deflection of the driver's cab, to determine a movement of the driver's cab with respect to the vehicle frame and, thus, a deflection of the driver's cab out of its reference position.

In another embodiment, the further sensor senses the frame, or fixtures rigidly connected to the frame, from a position rigidly connected to the driver's cab. In addition or alternatively, the further sensor senses the driver's cab from a position rigidly connected to the frame. Here, the control unit determines the deflection of the driver's cab from a change in positions of respectively sensed objects. In this embodiment, the further sensor is preferably a camera or other imaging sensor such as a RADAR or LIDAR sensor. In this way, it is possible for the movement of the cab relative to the vehicle frame to be directly sensed, which facilitates an estimation and/or calculation of the yaw rate at the vehicle frame from the yaw rate measured in the driver's cab.

In a further embodiment, the further sensor senses an acceleration of the vehicle on the vehicle frame in the direction of travel and/or transversely with respect to the direction of travel, wherein the control unit estimates and/or calculates the deflection of the driver's cab taking into consideration the acceleration and/or the measured steer angle and the mass of the driver's cab and the spring and damping characteristics of the resilient mounting of the driver's cab on the vehicle frame. Pitching of the driver's cab can be inferred from a measured acceleration of the vehicle in relation to the vehicle frame in the direction of travel, this also including negative accelerations, that is, decelerations. Correspondingly, rolling or lateral tilting of the driver's cab can be inferred from the steer angle and from the vehicle speed if the mass of the driver's cab and also the spring and damping characteristics thereof are known. Thus, a deflection of the driver's cab out of its reference position, specifically in the vehicle longitudinal direction and/or transverse direction, can be estimated and/or calculated with little outlay in terms of installation and apparatus.

It is advantageously the case that the mass of the driver's cab is determined by means of corresponding sensors for measuring the driver's cab mass. Here, use may, for example, be made of strain gauges or other sensors that determine a force. Such sensors permit a precise determination of mass. The determination of the mass of the driver's cab is therefore expedient because it is not constant. In particular, the mass of the driver's cab can be significantly influenced by boarding and alighting of co-drivers and by loading and unloading of baggage.

In a further embodiment, the mass of the driver's cab is determined by estimation and/or calculation. For this purpose, the control unit determines a deviation between the acceleration of the frame and a simultaneously measured acceleration of the driver's cab, in particular during a starting manoeuvre. Owing to the mass inertia and the resilient mounting of the driver's cab, the result is a mass-dependent acceleration behavior that deviates from that of the vehicle frame. The control unit evaluates the deviation in order thereby to determine the mass of the driver's cab. Particularly suitable for this purpose is a starting process from a standstill, because there are then generally no additional disturbance variables that falsify the mass estimation and/or calculation. The mass estimation and/or calculation is advantageous because, in this way, no additional mass sensor or weight sensor is required for the driver's cab.

The acceleration of the frame can advantageously be determined from the changes in wheel rotational speed, for which purpose signals from rotational speed sensors at the wheels of the vehicle are processed. In addition or alternatively, consideration may be given to signals from one or more acceleration sensors arranged on the frame or in components arranged on the frame. For example, use may be made of an acceleration sensor, arranged in the vehicle transmission, for determining the acceleration of the frame. The acceleration of the driver's cab is preferably determined by an acceleration sensor arranged in or on the driver's cab.

In another embodiment, the yaw rate sensor and the control unit, and preferably also the steer angle sensor, are arranged in a common structural unit, whereas the further sensor is provided outside the common structural unit. This is advantageous because a separation of the further sensor from the yaw rate sensor, in particular also a spaced-apart arrangement, makes it possible to sense significantly different values. The determination of the cab movement and/or the deflection of the cab from its reference position is simplified and improved in this way.

In a still further embodiment, the control unit comprises an "observer." The expression "observer" originates from the field of regulation technology and refers to a system that, using a model, reconstructs a non-measurable variable from known input variables. The observer is advantageously in the form of a hardware and/or software component. In this embodiment, the observer estimates and/or calculates the yaw rate at the vehicle frame as a function of the steer angle, the vehicle speed pertaining to the vehicle frame, the deflection of the driver's cab out of its reference position, if appropriate also the speed and/or acceleration of the cab deflection, in each case preferably about the vehicle transverse axis and the vehicle longitudinal axis, and an estimation error, evaluated for example by means of a feedback function, in the form of the difference between the measured yaw rate of the driver's cab and a yaw rate of the driver's cab estimated and/or calculated using a mathematical model. Such an observer makes it possible for the yaw rate at the vehicle frame to be estimated and/or calculated in a particularly efficient manner.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which:

FIG. 1 is a side view of a utility vehicle having a driver's cab resiliently mounted on a vehicle frame, in accordance with embodiments of the present invention;

FIG. 2 is a front view of the vehicle shown in FIG. 1;

DETAILED DESCRIPTION OF THE PREFERRED EMBODIMENTS

Figure 3:
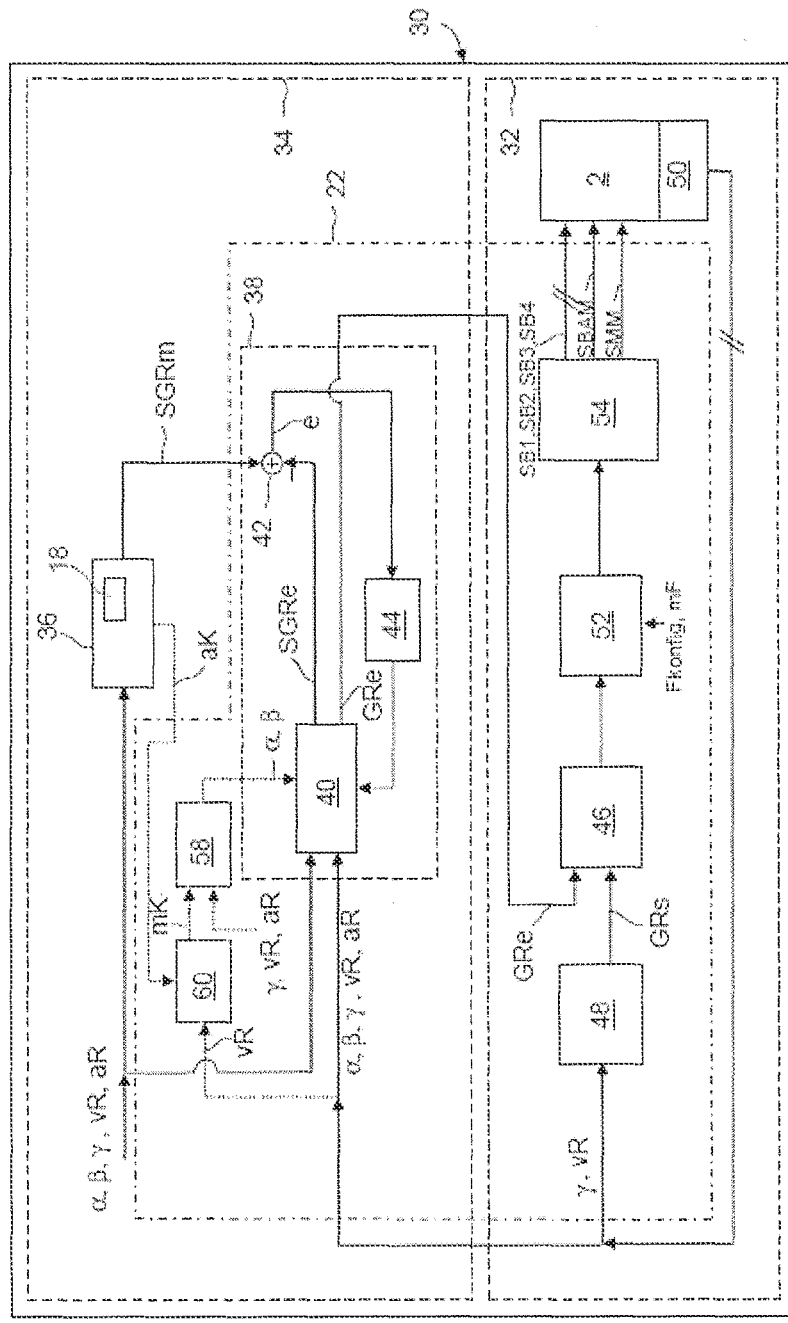
FIG. 3 is a block circuit diagram of a device for regulating the driving dynamics of a vehicle in accordance with an exemplary embodiment of the present invention.

FIG. 1 shows a vehicle 2 in the form of a utility vehicle in a side view in a highly simplified illustration. The utility vehicle 2 has a driver's cab 4, which, by way of a four-point suspension arrangement 6, is resiliently mounted on a vehicle frame 8 by means of four spring-damper arrangements 9. This type of mounting increases the driving comfort for the driver because it dampens roadway unevennesses.

A running gear having multiple wheels 10 is fastened to the vehicle frame 8, wherein the wheels 10 are indirectly connected to the vehicle frame 8. For this purpose, in a known way, spring-damper elements 12, which likewise dampen roadway unevennesses, are provided between the wheels 10 and the vehicle frame 8.

A superstructure 14 for accommodating goods to be transported is generally situated on the vehicle frame 8.

The spring-damper elements 12 are selected such that, even during cornering or in the event of intense acceleration (which also includes negative accelerations in the sense of a deceleration), the vehicle frame 8 is inclined or tilts only to an insignificant extent. That is, the vehicle frame 8 generally remains substantially parallel to the roadway 16.

By contrast, the four-point suspension arrangement 6 of the driver's cab 4 is of "softer" configuration so as to achieve a particularly high level of comfort for the driver, such that the driver's cab 4, for example during a braking operation, that is, in the event of negative acceleration, is tilted about an axis in the transverse direction with respect to the vehicle 2. This is referred to as so-called "pitching" of the driver's cab. Such a state of the driver's cab is indicated in FIG. 1 by a driver's cab 4' illustrated using dashed lines. By contrast, the driver's cab 4 is illustrated in its reference position using solid lines. The reference position is for example a position in which an unloaded driver's cab is situated when the vehicle is stationary on a flat underlying surface.

FIG. 2 shows the vehicle as per FIG. 1 in a view from the front, such as typically arises during cornering. While the vehicle frame 8 continues to be oriented substantially parallel to the roadway, the driver's cab 4—as indicated by the dashed lines—tilts away laterally, that is, about an axis in the longitudinal direction of the vehicle 2. Such a cab movement is referred to as "rolling."

Pitching, as per FIG. 1, may be specified by a deflection angle α, which is described, for example, by the angle between a vertical reference line in the reference position and in the deflected position (as shown in FIG. 1).

Analogously, a deflection of the driver's cab out of its reference position about the longitudinal direction leads to a deflection angle β as shown in FIG. 2.

According to embodiments of the present invention, essential components of a driving dynamics regulation system are accommodated in the driver's cab 4. Such components include, in particular, a yaw rate sensor 18 required for driving dynamics regulation and a steer angle sensor 20, these sensors preferably being arranged together with a control unit 22 in a common structural unit 24.

If pitching or rolling of the driver's cab 4 occurs, the yaw rate sensor 18 in particular is no longer situated in its original orientation and thereby loses sensitivity. For example, the sensitivity may decrease with the factor cosine α and/or cosine β, such that the yaw rate sensor signal measured by means of the yaw rate sensor 18 is correspondingly falsified. This is disadvantageous in particular if the yaw rate sensor 18 indicates an excessively low yaw rate, because this would cause a driving dynamics regulation system to assume that the yaw rate lies below a critical value even though it has already reached a critical value.

A measurement of a yaw rate in the driver's cab 4 therefore poses problems and requires correction in order that a yaw rate pertaining to the vehicle frame 8 can ultimately be inferred. Embodiments of the present invention therefore provide that the yaw rate at the vehicle frame 8 be estimated and/or calculated from the yaw rate measured at the driver's cab 4.

FIG. 3 shows a block diagram of a driving dynamics regulation device 30, which, aside from the actual driving dynamics regulation loop 32, has an estimation device 34 for estimating and/or calculating the yaw rate at the vehicle frame 8. The estimation device 34 comprises a real measurement system 36, which has the yaw rate sensor 18 and, if appropriate, a longitudinal and/or transverse acceleration sensor, and which generates a measured yaw rate sensor signal SGRm that, owing to the arrangement of the yaw rate sensor 18 in the driver's cab 4, is dependent on the steer angle γ, the vehicle speed vR and the vehicle acceleration aR, wherein these variables pertain to the vehicle frame 8, and the cab deflections α and β and the first and second derivatives with respect to time of the cab deflection. The yaw rate sensor signal SGRm is thus falsified in relation to a yaw rate sensor signal measured at the vehicle frame 8.

The estimation device 34 determines an estimated and/or calculated yaw rate GRe pertaining to the vehicle frame 8 by means of an observer 38, in the form of a hardware and/or software component, from the yaw rate sensor signal SGRm measured in the driver's cab 4.

The observer 38 comprises a mathematical model 40 for estimating and/or calculating a yaw rate GRe at the vehicle frame 8 from the yaw rate sensor signal SGRm measured at the driver's cab 4. The model 40 receives, on the input side, information regarding the steer angle γ, the vehicle speed vR, the vehicle acceleration aR and the cab movements in the form of the deflections α and β and the first and, if appropriate, second derivatives with respect to time of said deflections. The model 40 estimates and/or calculates a yaw rate sensor signal SGRe from the respective measurement variables for the steer angle γ, the vehicle speed vR, the vehicle acceleration aR and the cab movements in the form of the deflections α and β and the first and second derivatives with respect to time of the deflections. The estimated and/or calculated yaw rate sensor signal SGRe is compared with the measured yaw rate sensor signal SGRm by virtue of the difference between the measured and the estimated and/or calculated yaw rate sensor signal, that is, SGRm-SGRe, being formed as an estimation error e by means of a subtractor 42. The estimation error e is evaluated by means of a feedback function 44, if appropriate with a feedback matrix, and the result of the evaluation is fed back to the model 40. The model 44 is set up so as to minimize the estimation error e, such that the estimated and/or calculated yaw rate sensor signal SGRe is approximated to the falsified measured yaw rate sensor signal SGRm. At the same time, the model 40 generates an estimated and/or calculated yaw rate GRe at the vehicle frame 8, which cannot be measured by means of the real measurement system 36. In this way, the observer 38 provides an estimated and/or calculated yaw rate pertaining to the vehicle frame 8, and transmits the estimated and/or calculated yaw rate GRe to the driving dynamics regulating loop 32, specifically to a block 46 that determines a regulating error. The block 46 also receives a setpoint yaw rate GRs that should be generated in the presence of a certain steer angle γ and a certain vehicle speed vR. The setpoint yaw rate GRs is determined in a reference model 48 to which data regarding the steer angle γ and the vehicle speed vR are supplied from corresponding sensors 50 on the vehicle 2.

The regulating error block 46 determines the difference between the estimated and/or calculated yaw rate GRe and the setpoint yaw rate GRs and then transmits the difference to the regulator 52, at least when the difference lies above a predefined threshold value. Then, taking into consideration further vehicle data and/or further vehicle parameters such as the vehicle configuration FKonfig and the vehicle mass mF, the regulator determines regulating parameters and transmits the regulating parameters to a block 54, which receives information regarding an intervention strategy, and which is thus referred to as intervention strategy block 54. On the basis of intervention strategy rules, the block determines control signals SB1, SB2, SB3, SB4, in particular for the brake pressures B1, B2, B3, B4 at the wheels 10, and, if appropriate, a control signal SBAH for a trailer brake pressure and a control signal SMM for a setpoint drive torque, which indicates to the engine of the vehicle 2 what torque the engine should generate. The vehicle 2 is thus influenced so as to attain a stable driving state.

The stated sensors 50 monitor the vehicle 2 so as to obtain data and/or parameters regarding the vehicle and/or the movement of the vehicle.

In particular, the sensors 50 provide information regarding the movement of the driver's cab 4. The information is supplied not only to the reference model 48 but also to the model 40 of the observer 38.

For example, the sensors 50 may thus comprise one or more cameras arranged on the driver's cab 4. An associated image processing unit determines the deflection angles α and β of the camera from a change in the segment observed by the camera.

Figure 4A:
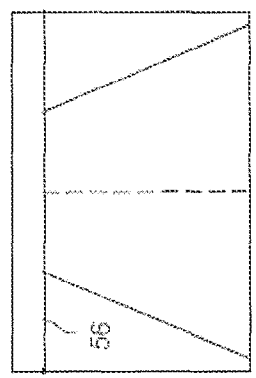
FIG. 4A shows a camera image from a camera mounted on the driver's cab in a reference position of the driver's cab from the reference position as per FIG. 1.

FIG. 4A illustrates the road image recorded by the camera, wherein FIG. 4A shows the segment when the driver's cab is situated in its reference position.

Figure 4B:
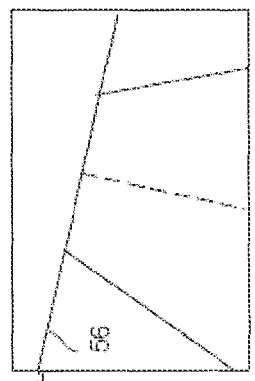
FIG. 4B shows a camera image from a camera mounted on the driver's cab in the event of a deflection of the driver's cab out of the reference position as per FIG. 1.

FIG. 4B shows the camera image when the driver's cab has been deflected through the angle α, as illustrated in FIG. 1. It can be clearly seen how the horizon 56 in the camera image has moved upward. Such a displacement of the segment of the image of the surroundings can be calculated using routine image processing methods. Taking into consideration the installation position of the camera in the driver's cab, the deflection angle α is thus attained.

Figure 5A:
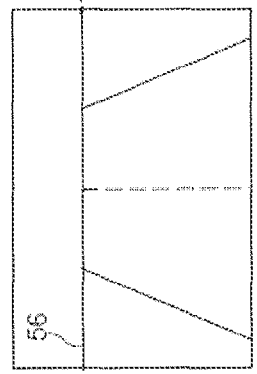
FIG. 5A shows a camera image from a camera mounted on the driver's cab in a reference position of the driver's cab from the reference position as per FIG. 2.
Figure 5B:
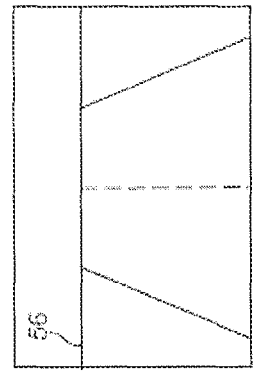
FIG. 5B shows a camera image from a camera mounted on the driver's cab in the event of a deflection of the driver's cab out of the reference position as per FIG. 2.

In a similar manner, FIGS. 5A and 5B illustrate a change in the camera image in the event of a deflection of the driver's cab as illustrated in FIG. 2. In the case of a deflection of the driver's cab 4 through the deflection angle β, the horizon 56 is pivoted. The corresponding pivot angle corresponds to the deflection angle β. The image processing unit can calculate such displacements using routine image processing methods, and infer from these the deflection angles α and β of the driver's cab.

Instead of a camera for determining the deflection of the driver's cab 4 out of its reference position, use may also be made of other sensors such as RADAR sensors or LIDAR sensors, which likewise sense the environment of the vehicle 2 and thus yield information regarding any cab movements. Basically, any sensor that serves for sensing the environment, and that is arranged on the cab in order to infer cab movements, is suitable.

Likewise suitable, however, are sensors arranged, for example, on the frame 8 or on the superstructure 14, which sense the driver's cab 4 in order to determine cab movements. Likewise suitable are sensors mounted on the driver's cab 4, which sense the vehicle frame 8 and/or the superstructure 14 and thus yield information regarding relative movement between the driver's cab 4 and vehicle frame 8.

Aside from the direct sensing of the cab movement by means of sensors, the cab movement may, however, also be determined by means of an estimation and/or calculation. For this purpose, the estimation device 34 for estimating and/or calculating the yaw rate GRe comprises an estimation device 58 for estimating and/or calculating the cab movement. If data regarding the vehicle speed vR, the vehicle acceleration aR and the steer angle γ are available to the estimation device 58, and if the characteristics of the four-point suspension arrangement 6 are also known, in particular with regard to the spring and damping characteristics of the suspension arrangement, and if the mass mK of the cab is also known, the estimation device 58 can estimate and/or calculate the cab movement.

Furthermore, the cab mass mK may also be estimated and/or calculated by means of a further estimation device 60 for estimating and/or calculating the cab mass mK. For this purpose, the estimation device 60 requires values regarding the cab acceleration aK and the vehicle acceleration aR pertaining to the vehicle frame 8. In particular during starting from a standstill, the cab acceleration aK will be lower than the vehicle acceleration aR, such that the cab mass mK can be inferred from the difference. The cab mass need not imperatively be measured, but may alternatively be determined by means of an estimation and/or calculation.

The function blocks (that is, not the sensors) shown in FIG. 3 are preferably implemented as software in the control unit 22, such that the control unit 22 comprises a processor unit.

The control unit 22 is preferably integrated with the controller of an anti-lock braking system or of an electronic braking system.

All of that having been said, the present invention permits the determination of reliable yaw rates pertaining to the vehicle frame, even though the yaw rate measurement takes place not on the vehicle frame but rather in the driver's cab. For this purpose, use is advantageously made of already existing sensors of other system components or driver assistance systems, such as, for example, one or more cameras of a lane keeping assistance system, or of RADAR or LIDAR data from a proximity warning system. The falsification of the yaw rate sensor in the driver's cab owing to cab movements can be corrected according to the invention, such that a yaw rate pertaining to the vehicle frame can be estimated and/or calculated. Thus, the present invention permits the compensation of cab movements, wherein use is advantageously made of the so-called observer model.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A device for regulating the driving dynamics of a vehicle having a driver's cab mounted resiliently with respect to a frame of the vehicle, the device comprising a steer angle sensor configured to measure a steer angle; a yaw rate sensor in the driver's cab and configured to measure a yaw rate of the driver's cab; a further sensor configured to determine a deflection of the driver's cab out of a reference position; and a control unit configured to evaluate the sensor signals from the steer angle, yaw rate and further sensors and to influence at least one of a brake system and a drive of the vehicle as a function of the sensor signals, the control unit being configured to at least one of estimate and calculate a yaw rate of the vehicle frame as a function of the measured yaw rate of the driver's cab and as a function of the deflection of the driver's cab out of its reference position, and to influence at least one of the brake system and the drive when the difference between the at least one of estimated and calculated yaw rate of the vehicle frame and a setpoint yaw rate determined by the control unit at least as a function of the measured steer angle and vehicle speed pertaining to the vehicle frame is above a predefined threshold value.

2. The device according to claim 1, wherein the further sensor is associated with one of a further control and regulation system of the vehicle that serves a function other than driving dynamics regulation, and wherein the further sensor additionally detects at least one of further data and further parameters concerning at least one of the vehicle and the vehicle's environment and the vehicle's movement.

3. The device according to claim 1, wherein the further sensor is configured to sense a segment of the environment of the vehicle from the driver's cab, and the control unit is configured to determine the deflection of the driver's cab based on a change in the sensed segment.

4. The device according to claim 1, wherein the further sensor is configured to at least one of:
a) sense one of the frame and a superstructure rigidly connected to the frame from a position connected to the driver's cab, and
b) sense the driver's cab from a position rigidly connected to one of the frame and the superstructure; and
the control unit is configured to determine the deflection of the driver's cab from a change in a position of a sensed object.

5. The device according to claim 1, wherein the further sensor is configured to sense an acceleration of the vehicle on the frame in at least one of a direction of travel and transversely with respect to the direction of travel, and the control unit is configured to at least one of estimate and calculate the deflection of the driver's cab based on:
a) at least one of the acceleration and the measured steer angle,
b) the mass of the driver's cab, and
c) spring and damping characteristics of the mounting of the driver's cab on the frame.

6. The device according to claim 5, further comprising mass sensors for sensing the mass of the driver's cab.

7. The device according to claim 5, wherein the control unit is configured to at least one of estimate and calculate the mass of the driver's cab from a deviation between an acceleration of the frame and an acceleration of the driver's cab.

8. The device according to claim 1, wherein the yaw rate sensor and the control unit are arranged in a common structural unit, and the further sensor is arranged outside the common structural unit.

9. The device according to claim 1, wherein the control unit is configured to at least one of estimate and calculate the yaw rate of the frame as a function of the steer angle, the vehicle speed pertaining to the vehicle frame, the deflection of the driver's cab out of its reference position, and a difference between the measured signal of the yaw rate sensor and a yaw rate sensor signal pertaining to the driver's cab that is at least one of estimated and calculated using a mathematical model.

10. A vehicle, comprising the device according to claim 1.

11. A method for regulating the driving dynamics of a vehicle having a driver's cab mounted resiliently with respect to a frame of the vehicle, the method comprising:
measuring a steer angle using a steer angle sensor;
measuring a yaw rate of the driver's cab using a yaw rate sensor in the driver's cab;
determining a deflection of the driver's cab out of a reference position using a further sensor;
evaluating the sensor signals provided by the steer angle, yaw rate and further sensors in a control unit;
influencing at least one of a brake system and a drive of the vehicle as a function of the sensor signals;
using the control unit, at least one of estimating and calculating a yaw rate of the vehicle frame as a function of the measured yaw rate of the driver's cab and as a function of the deflection of the driver's cab out of its reference position; and
influencing at least one of the brake system and the drive when the difference between the at least one of estimated and calculated yaw rate of the frame and a setpoint yaw rate determined by the control unit at least as a function of the measured steer angle and the vehicle speed pertaining to the vehicle frame is above a predefined threshold value.

* * * * *